US006252328B1

(12) United States Patent
Brem et al.

(10) Patent No.: US 6,252,328 B1
(45) Date of Patent: Jun. 26, 2001

(54) ELECTRICAL MACHINE WITH A ROTOR PROVIDED WITH AMORTISSEUR BARS

(75) Inventors: Ernst Brem, Schlieren; Josef Tommer, Würenlos, both of (CH)

(73) Assignee: Asea Brown Boveri AG, Baden (CH)

( * ) Notice: Subject to any disclaimer, the term of this patent is extended or adjusted under 35 U.S.C. 154(b) by 0 days.

(21) Appl. No.: 09/294,018

(22) Filed: Apr. 19, 1999

(30) Foreign Application Priority Data

Apr. 23, 1998 (DE) .............................................. 198 18 150

(51) Int. Cl.[7] ...................................................... H02K 3/48
(52) U.S. Cl. ......................... 310/214; 310/217; 310/218; 310/201; 310/203; 310/208; 310/216; 310/267; 310/270
(58) Field of Search .................................. 310/214, 215, 310/216, 217, 218, 203, 201, 208, 270, 267

(56) References Cited

U.S. PATENT DOCUMENTS

| 3,909,931 | * | 10/1975 | Lambercth ............................. 29/596 |
| 4,363,986 | | 12/1982 | Joho et al. . |
| 4,453,101 | | 6/1984 | Nelson . |
| 4,584,497 | * | 4/1986 | Butman, Jr. et al. ................ 310/214 |
| 5,122,698 | | 6/1992 | Walker et al. . |
| 5,430,340 | | 7/1995 | Shih et al. . |
| 5,606,211 | | 2/1997 | Morrison et al. . |
| 5,708,315 | * | 1/1998 | Gould et al. ......................... 310/180 |

FOREIGN PATENT DOCUMENTS

| 1463872 | 4/1969 | (DE) . |
| 1918859 | 10/1970 | (DE) . |
| 1638274 | 7/1971 | (DE) . |
| 2411933 | 9/1974 | (DE) . |
| 93 15 587 U | 1/1994 | (DE) . |

* cited by examiner

Primary Examiner—Nestor Ramirez
Assistant Examiner—Thanh Lam
(74) Attorney, Agent, or Firm—Burns, Doane, Swecker & Mathis, L.L.P.

(57) ABSTRACT

An electrical machine (10), in particular a generator, comprises a rotor (12) with pole zones, in which pole zones amortisseur bars (15) designed as wedges are arranged, which amortisseur bars (15), on the outside of the rotor (12), are pushed into slots (14) provided for this purpose and running in the longitudinal direction and are held in the slots (14) by supporting means (28) against the centrifugal forces occurring during rapid rotation of the rotor (12) and which are connected to one another in an electrically conductive manner at the ends of the rotor (12) by an amortisseur ring (18) or amortisseur segments (17), which enclose the rotor (12) in an annular or ring-section-shaped manner. In such a machine, reliable fixing and electrical bonding of the amortisseur bar in the slot when the machine is stopped and at low rotational speeds with at the same time ease of fitting is achieved in that prestressable spring elements (22, 23, 24) are arranged in a distributed manner on the underside of the amortisseur bars (15), which spring elements (22, 23, 24), in the prestressed state, enable the amortisseur bars (15) to be pushed into the slots (14) without hindrance and, after the prestressing has been removed, press the amortisseur bars (15) against the supporting means (28) and at the ends of the rotor (12) against the amortisseur rings (18) or amortisseur segments (17).

8 Claims, 2 Drawing Sheets

ELECTRICAL MACHINE WITH A ROTOR PROVIDED WITH AMORTISSEUR BARS

BACKGROUND OF THE INVENTION

1. Field of the Invention

The present invention relates to the field of electrical machines, in particular generators having amortisseur bars.

2. Discussion of Background

Amortisseur windings ("amortisseur bars") are used in the rotors of electrical machines for various reasons. The arrangement and function of such amortisseur bars are explained, for example, in publications U.S. Pat. No. 4,453, 101, U.S. Pat. No. 5,122,698 or U.S. Pat. No. 5,606,211. In this case, the amortisseur bars may be arranged in the winding slots between the winding bars and the locking wedges, as shown in U.S. Pat. No. 5,122,698. However, they may also be designed as locking wedges of winding slots, as shown in U.S. Pat. No. 5,606,211. The amortisseur bars are electrically connected to one another at their ends by amortisseur rings or amortisseur segments slipped over the rotor.

A specific use of the amortisseur bars relates to the pole zones of rotors. In the pole zones, in which there are no winding bars, special slots having a small depth are provided for accommodating the amortisseur bars, which are inserted or pushed into said slots (U.S. Pat. No. 4,363,986). So that the amortisseur bars are securely held in the slots by the centrifugal forces occurring at the high rotational speeds during operation, special provisions have to be made. This may be achieved by locking wedges pushed into the slots above the amortisseur bars (U.S. Pat. No. 5,122,698). However, this may also be achieved by retaining rings shrunk onto the rotor (U.S. Pat. No. 4,363,986). Finally, however, it is also possible to design the amortisseur bars themselves like locking wedges (U.S. Pat. No. 5,606,211).

In all cases, it has to be taken into account that the amortisseur bars must be pushed over a relatively large rotor length into the slots and secured there. In order not to make it unnecessarily difficult to push in the amortisseur bars during fitting, sufficient clearance is provided between the amortisseur bars or locking wedges and the slots. On the one hand, the result of this is that the amortisseur bars, at low rotational speeds or when the machine is stopped, only rest loosely in the slots provided for this purpose and tend to rattle. On the other hand, however, the result of this, in particular, is also that, at low rotational speeds or when the machine is stopped, the electrical contact between the ends of the amortisseur bars and the amortisseur rings or segments above them, but also between the amortisseur bars and the rotor core, either does not exist at all or is inadequate on account of the lack of contact pressure, so that scorching may occur when the amortisseur bars are carrying current. At the high rotational speeds during normal operation, however, the amortisseur bars and locking wedges are pressed outward by the centrifugal forces produced and are fixed by the corresponding wedge shape of the slots, so that the play is removed and at the same time sufficient contact with the amortisseur rings or segments and the rotor core is produced and ensured.

In order to avoid the adverse effects of the mechanical play when the machine is stopped or at low rotational speeds of the machine, it has been proposed in U.S. Pat. No. 5,122,698 to insert spring strips curved in the transverse direction into the slot below the amortisseur bars, which spring strips press the amortisseur bar (and the locking wedge above it) against the bevels in the side walls of the slot and at the same time press the projecting ends of the amortisseur bars against the amortisseur ring. However, even during fitting, the inserted spring strips result in very high frictional forces when the locking wedge is pushed in, so that in this solution a special lever mechanism has to be used for the pushing-in (FIG. 6 in U.S. Pat. No. 5,122,698) and ease of fitting by hand is no longer possible.

SUMMARY OF THE INVENTION

Accordingly, one object of the invention is to improve an electrical machine of the type mentioned at the beginning in such a way that, in the case of the amortisseur bars provided in the rotor, both ease of fitting and sufficient applied pressure of the amortisseur bars are achieved even when the machine is stopped or at low rotational speeds of the machine.

The object is achieved in a machine of the type mentioned at the beginning in that prestressable spring elements are arranged in a distributed manner on the underside of the amortisseur bars, which spring elements, in the prestressed state, enable the amortisseur bars to be pushed into the slots without hindrance and, after the prestressing has been removed, press the amortisseur bars against the supporting means and at the ends of the rotor against the amortisseur rings or amortisseur segments. The essence of the invention consists in fixing the amortisseur bars in the slots and electrically connecting them to the amortisseur ring by means of spring elements, even when the machine is stopped, by loading the amortisseur bars with a sufficient applied pressure. In this case, the spring elements are designed to be prestressable. For the fitting (pushing-in) of the amortisseur bars, the spring elements are prestressed (or compressed) in such a way that they produce no additional frictional forces when the amortisseur bars are being pushed in. If the amortisseur bar has been fitted (pushed in), the prestressing is removed, and the spring elements expand between the underside of the amortisseur bar and the base of the slot and press the amortisseur bar radially outward into the wedge seat of the slot or against the amortisseur ring.

In principle, it would be conceivable to arrange the spring elements in a sunk position in the amortisseur bars. This would have the advantage that the slots for accommodating the amortisseur bars could be retained unchanged in their cross-sectional shape. However, such a sunk arrangement would lead to a local reduction of the cross section of the amortisseur bars and thus to an undesirable increase in the electrical resistance. In order to avoid this, the underside of the amortisseur bars, in a first preferred embodiment of the invention, is of flat design, and, to accommodate the spring elements, in each case a gap-like intermediate space is provided below the amortisseur bars in the slots.

A second preferred embodiment of the machine according to the invention is distinguished by the fact that the individual spring elements are fixed to the respective amortisseur bar. As a result, the spring elements, together with the amortisseur bar, can be pushed into the slot without problem and are also secured against slipping during the subsequent operation.

A preferred development of this embodiment is distinguished by the fact that the amortisseur bars each have a plurality of through-holes, that the spring elements are each fixed in one of the through-holes and can be prestressed through this through-hole, that each spring element has a clamping sleeve with an internal thread, which clamping sleeve reaches into the associated through-hole in the amortisseur bar and thus fixes the spring element to the amortisseur bar, and by means of which clamping sleeve the spring element can be pressed against the underside of the amortisseur bar against the spring force and can thus be prestressed, and that a clamping bolt is provided in each case in order to prestress the spring elements, which clamping bolt is screwed with a male thread through the respective through-hole into the clamping sleeve of the spring element to be prestressed. The clamping bolt prestresses the spring elements in a simple manner and secures them against slipping when the amortisseur bar is being pushed in. If the amortisseur bar has been pushed in, the clamping bolts are simply slackened or unscrewed. The spring elements are thus activated and press the amortisseur bar into the slot, while they continue to remain fixed by the clamping sleeves.

In this case, the spring elements are preferably designed as leaf- or disk-shaped springs.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
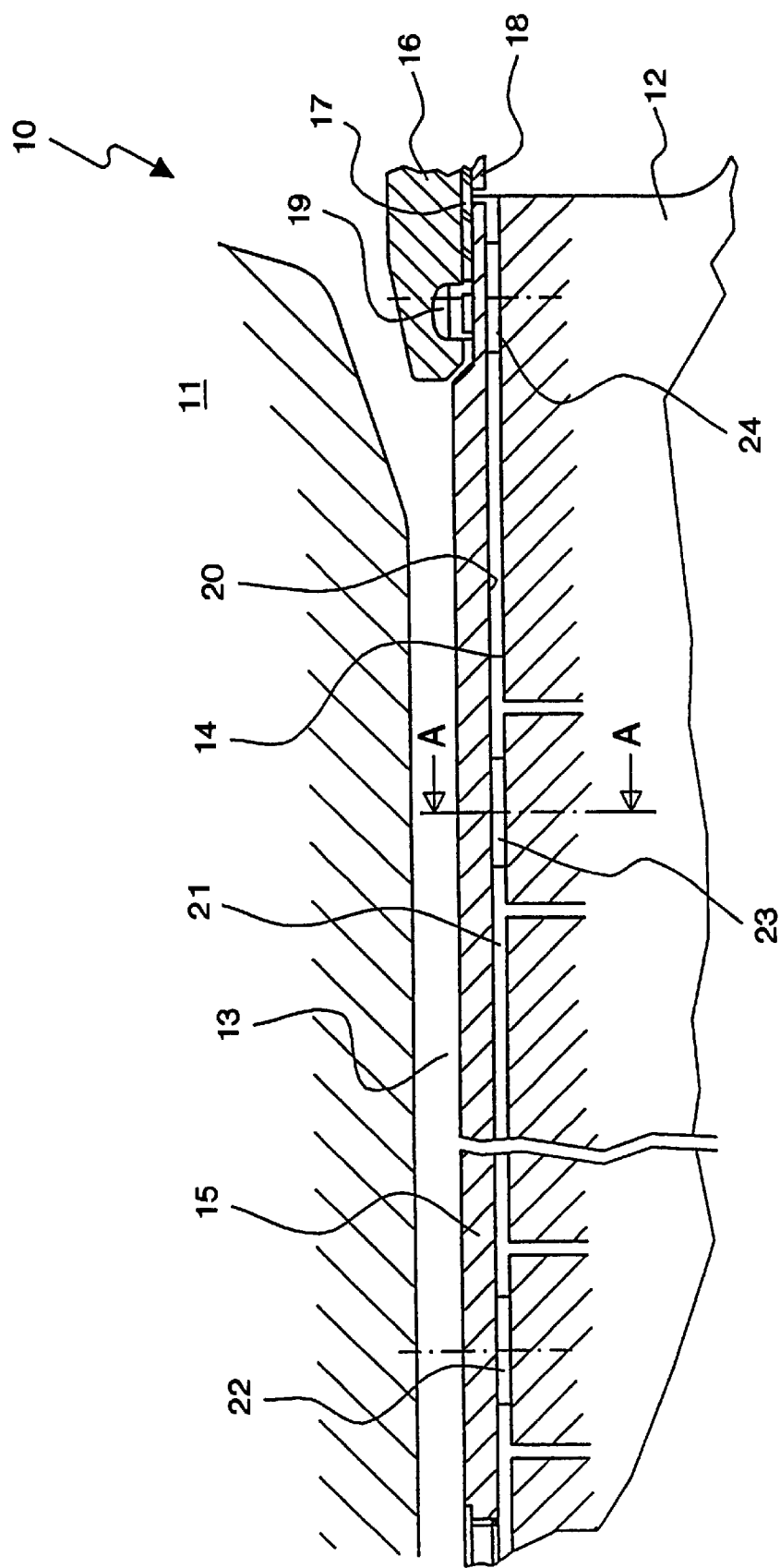
FIG. 1 shows a longitudinal section (along plane B—B from FIG. 3) of a detail of an electrical machine in a preferred exemplary embodiment of the invention.

Referring now to the drawings, wherein like reference numerals designate identical or corresponding parts throughout the several views, FIG. 1 reproduces a longitudinal section of a detail of an electrical machine in a preferred exemplary embodiment of the invention. Of the electrical machine 10, which in particular may be a generator, only the inner boundary of the stator 11 and part of the rotor 12, which is mounted so as to be rotatable inside the stator 11 with an air gap 13 and contains (in one pole zone) an exemplary amortisseur bar 15, can be seen here. The axis of rotation (not depicted) runs horizontally in FIG. 1. The amortisseur bar 15 is pushed from the side, with clearance, into a slot 14, which is made in the rotor 12 and runs parallel to the axis of rotation. As can be recognized from the cross section in FIG. 3, the amortisseur bar is designed like a locking wedge, which, when forces (centrifugal and/or spring forces) directed radially outward occur, is supported with inwardly sloping sides on corresponding bevels 28 in the slot 14 in such a way as to be centered and fixed in position.

The amortisseur bars 15 have a flat underside. Below the amortisseur bar 15, a gap-like intermediate space 21 (of rectangular cross section), which serves to accommodate a plurality of spring elements 22, 23 and 24 distributed over the length of the amortisseur bar, is provided in the slot 14. The spring elements 22, 23 and 24 are only indicated as rectangles in FIG. 1. Their exemplary configuration can be seen from the enlarged representation in FIG. 2 and FIG. 3. The spring elements 22, 23 and 24 are supported on the base of the slot 14 or the intermediate space 21 and load the amortisseur bar 15 from the underside with spring forces which press the amortisseur bar 15 over most of its length against the bevels 28 of the slot 14. The amortisseur bar 15 is thus fixed free of play in the slot—even if there are no centrifugal forces or if there are only slight centrifugal forces, i.e. when the machine 10 is stopped or at low rotational speeds of the machine 10—and is in electrical contact over its entire length with the core of the rotor 12.

A special situation arises at the end of the amortisseur bar 15 (right-hand side in FIG. 1). In the region where a rotor cap 16 encloses the end of the rotor 12, the slot 14 opens and the amortisseur bar 15 extends with a flattened end right under the rotor cap 16. Below the rotor cap 16, the amortisseur bar 15 is pressed from inside against an amortisseur ring 18 or against an amortisseur segment 17 of ring-section-shaped design, which is fastened to the amortisseur ring 18 and connects a plurality of adjacent amortisseur bars to one another at their ends in an electrically conductive manner. The amortisseur segments 17 and the amortisseur ring 18 are fixed relative to the rotor cap 16 by means of a slot in the rotor cap 16. In the region of the overlapping rotor cap 16, the spring element 24 is arranged below the amortisseur bar 15. Whereas the spring elements 22, 23 lying in the center region of the amortisseur bar 15 press the amortisseur bar 15 into the slot, the specific task of the spring element 24 is to press the flat end of the amortisseur bar 15 against the amortisseur segment 17 above it and thus ensure good electrical contact between amortisseur bar 15 and amortisseur segment 17 under all operating conditions.

Figure 2:
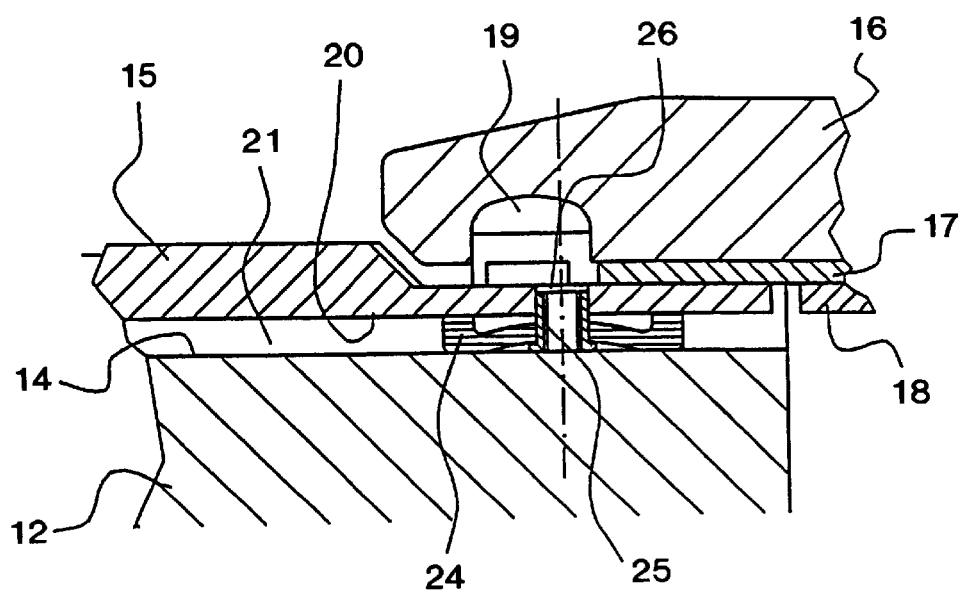
FIG. 2 shows the right-hand part of FIG. 1 in an enlarged representation.
Figure 3:
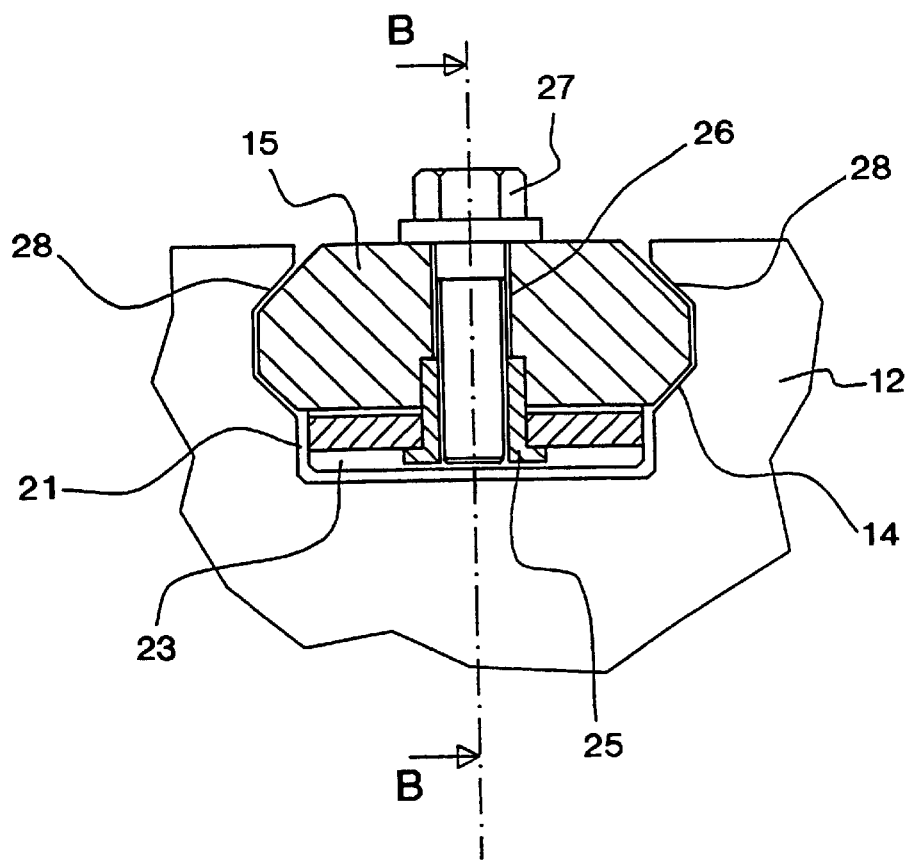
FIG. 3 shows the cross section along plane A—A in FIG. 1, in which case the spring element is still prestressed by means of a clamping bolt.

The spring elements 22, 23, 24 themselves—as becomes clear from FIGS. 2 and 3—are preferably designed as (rectangular) leaf or (round) disk springs stressed in bending. They each have a central hole, through which a clamping sleeve 25 is inserted for the prestressing. To fix the spring elements 22–24 to the amortisseur bar 15 and to prestress the spring elements, perpendicular through-holes 26 are made in the amortisseur bar 15 at the locations intended for this purpose. The clamping sleeves 25 of the spring elements 22–24 are located with part of their length in the through-holes 26 and thus secure the spring elements 22–24 against slipping. At the same time, according to FIG. 3, a clamping bolt 27 provided with a male thread can be inserted through the through-hole 26 from above and screwed into the clamping sleeve 25, which is provided with a matching internal thread. The clamping bolt 27, which is supported on the top side of the amortisseur bar 15, pulls the clamping sleeve 25 into the through-hole 26 when being screwed in, the clamping sleeve 25, by means of an encircling shoulder, gripping behind the spring element and prestressing the latter.

In the prestressed state (FIG. 3), the spring element 23 is pressed tightly against the underside of the amortisseur bar 15, so that sufficient clearance remains toward the base of the slot 14 or the intermediate space 21. The amortisseur bar 15, together with the prestressed (compressed) spring elements 22–24, can thus be pushed manually into the slot 14 without effort. If the amortisseur bar 15 then sits in its final place in the slot 14, the clamping bolts 27 are slackened or completely unscrewed. The spring elements 22–24 are then released into the intermediate space 21 and, while being supported on the base of the slot 14, load the amortisseur bar 15 from below with a spring force or spring tension (FIG. 2) which, even when the machine is stopped or at low rotational speeds of the machine, secures the amortisseur bar against rattling and ensures good electrical contact between amortisseur bar 15 and rotor core or the amortisseur segment 18.

On the whole, the invention results in an electrical machine in which the amortisseur bars inserted in the rotor are securely fixed and electrically bonded even when the machine is stopped and at low rotational speeds, and the amortisseur bars, during fitting, can nonetheless be pushed in a simple manner without auxiliary means into the slots provided for this purpose.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. An electrical machine comprising a rotor with pole zones, in which pole zones amortisseur bars designed as wedges are arranged, which amortisseur bars, on the outside of the rotor, are pushed into slots provided for this purpose and running in the longitudinal direction and are held in the slots by supporting means against the centrifugal forces occurring during rapid rotation of the rotor and which are connected to one another in an electrically conductive manner at the ends of the rotor by an amortisseur ring which encloses the rotor in an annular or ring-section-shaped manner, wherein prestressable spring elements are arranged in a distributed manner on the underside of the amortisseur bars, which spring elements, in the prestressed state, enable the amortisseur bars to be pushed into the slots without hindrance and, after the prestressing has been removed, press the amortisseur bars against the supporting means and at the ends of the rotor against the amortisseur ring, and wherein each spring element has a clamping sleeve with an internal thread, which clamping sleeve reaches into the associated through-hole in the amortisseur bar and thus fixes the spring element to the amortisseur bar, and by means of which clamping sleeve the spring element can be pressed against the underside of the amortisseur bar against the spring force and can thus be prestressed.

2. The machine as claimed in claim 1, wherein a clamping bolt is provided in each case in order to prestress the spring elements, which clamping bolt is screwed with a male thread through the respective through-hole into the clamping sleeve of the spring element to be prestressed.

3. The machine as claimed in claim 1, wherein the spring elements are designed as leaf- or disk-shaped springs.

4. The electrical machine of claim 1, wherein the electrical machine is a generator.

5. An electrical machine comprising a rotor with pole zones, in which pole zones amortisseur bars designed as wedges are arranged, which amortisseur bars, on the outside of the rotor, are pushed into slots provided for this purpose and running in the longitudinal direction and are held in the slots by supporting means against the centrifugal forces occurring during rapid rotation of the rotor and which are connected to one another in an electrically conductive manner at the ends of the rotor by amortisseur segments, which enclose the rotor in an annular or ring-section-shaped manner, wherein prestressable spring elements are arranged in a distributed manner on the underside of the amortisseur bars, which spring elements, in the prestressed state, enable the amortisseur bars to be pushed into the slots without hindrance and, after the prestressing has been removed, press the amortisseur bars against the supporting means and at the ends of the rotor against the amortisseur segments, and wherein each spring element has a clamping sleeve with an internal thread, which clamping sleeve reaches into the associated through-hole in the amortisseur bar and thus fixes the spring element to the amortisseur bar, and by means of which clamping sleeve the spring element can be pressed against the underside of the amortisseur bar against the spring force and can thus be prestressed.

6. The machine as claimed in claim 5, wherein a clamping bolt is provided in each case in order to prestress the spring elements, which clamping bolt is screwed with a male thread through the respective through-hole into the clamping sleeve of the spring element to be prestressed.

7. The machine as claimed in claim 5, wherein the spring elements are designed as leaf- or disk-shaped springs.

8. The electrical machine of claim 5, wherein the electrical machine is a generator.

* * * * *